United States Patent [19]
Kampe

[11] 3,799,378
[45] Mar. 26, 1974

[54] METHOD FOR HARVESTING BALED CROPS

[76] Inventor: Dwight F. Kampe, 1310 Sherwood Rd., Williamston, Mich. 48895

[22] Filed: Apr. 5, 1972

[21] Appl. No.: 241,474

Related U.S. Application Data

[62] Division of Ser. No. 100,096, Dec. 21, 1970, Pat. No. 3,690,691.

[52] U.S. Cl. ................... 214/152, 214/6 B, 214/58
[51] Int. Cl. ............................................. B65g 57/32
[58] Field of Search ........ 214/6 B, 6 P, 10.5 R, 152, 214/44 R, 44 A, 57, 58, 310

[56] References Cited
UNITED STATES PATENTS

| | | | |
|---|---|---|---|
| 2,728,601 | 12/1955 | Quigley | 214/6 B X |
| 3,308,971 | 3/1967 | Sinden et al. | 214/6 B |
| 2,702,140 | 2/1955 | Momyer | 214/10.5 R |
| 2,570,757 | 10/1951 | Bowman et al. | 214/10.5 R X |
| 3,587,877 | 6/1971 | Hornibrook | 214/6 B UX |
| 3,278,050 | 10/1966 | Tarbox | 214/6 B |
| 3,246,774 | 4/1966 | Bishop | 214/6 B |

FOREIGN PATENTS OR APPLICATIONS

| | | | |
|---|---|---|---|
| 258,373 | 10/1963 | Australia | 214/6 B |

*Primary Examiner*—Robert J. Spar
*Attorney, Agent, or Firm*—Malcolm R. McKinnon

[57] ABSTRACT

An improved method and improved apparatus for harvesting baled crops wherein a trailing bale stacker is provided which is adapted to be pulled over the ground by a baling machine, the bale stacker including pallet support means and platform means, and enabling the manual stacking of baled crops onto pallets for subsequent haulage to and storage in a storage area.

1 Claim, 9 Drawing Figures

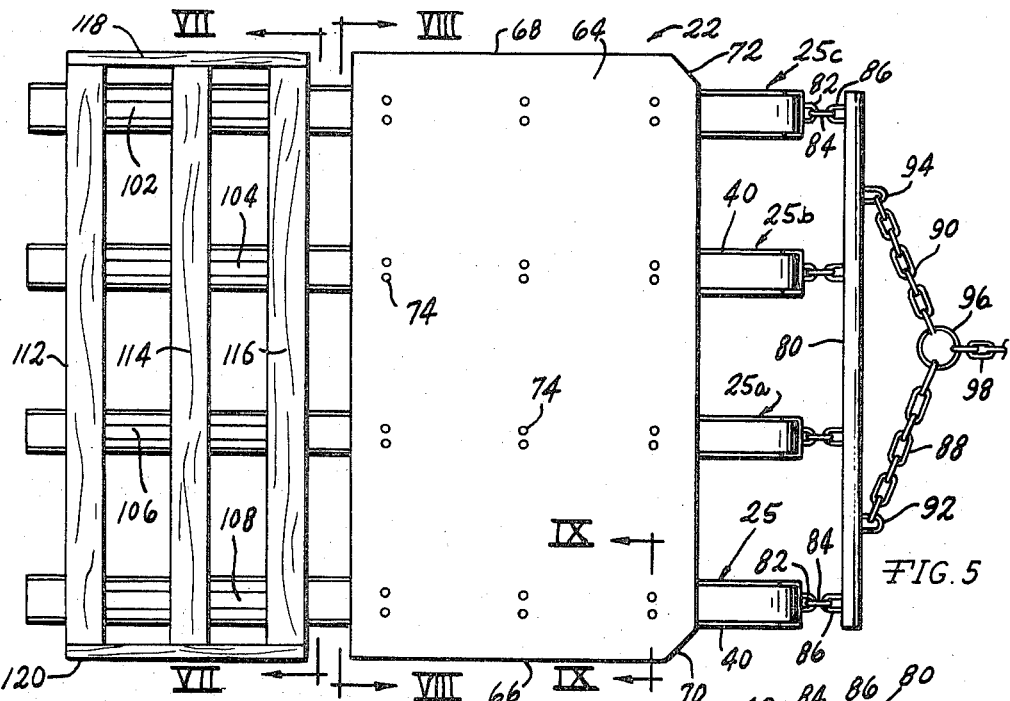
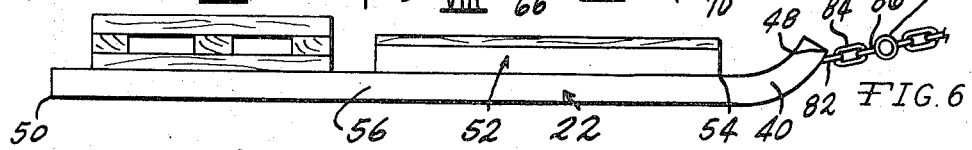
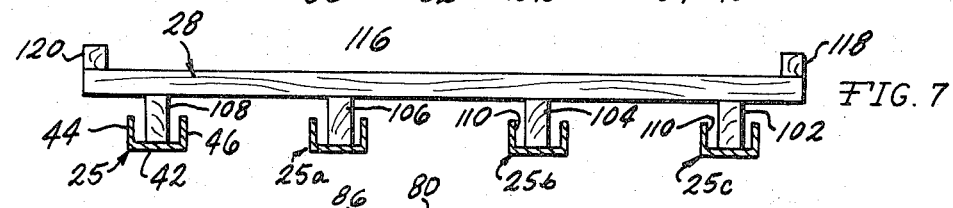
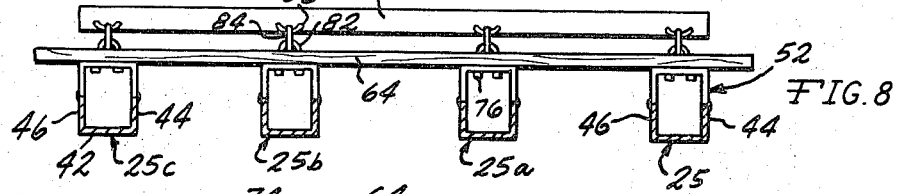
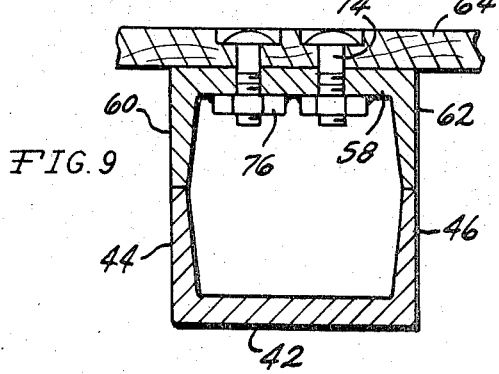

METHOD FOR HARVESTING BALED CROPS

This is a division, of application Ser. No. 100,096, filed Dec. 21, 1970 now U.S. Pat. No. 3,690,691 issued Sept. 12, 1972.

BRIEF SUMMARY OF THE INVENTION

This invention relates to harvesting and, more particularly, to an improved method and improved apparatus for harvesting baled crops, such as hay and alfalfa.

As is well known in the art, heretofore baling machines have been marketed which sequentially pick up and bale crops, such as hay and alfalfa, the baled crops being pushed from such machines directly onto a wagon or dropped from such machines onto the ground for subsequent pick up and storage. As is also well known in the art, heretofore automatic bale wagons have been marketed which are adapted to pick up bales, automatically stack the bales onto a wagon and haul the stacked bales to a storage area, these last mentioned automatic bale wagons being particularly well known in the western United States where relatively large tracts of land are utilized for the growing of crops of the indicated character which are usually baled for storage and/or shipping purposes. However, such automatic bale wagons are relatively complicated and expensive with the result that it is often not economically feasible for relatively small farmers to own and/or operate these well known automatic bale wagons. As a result, it has been necessary for relatively small farmers to manually pick up the bales dropped from a baling machine and manually load the bales individually onto wagons for haulage to a storage area where the bales are manually unloaded from the wagons and stacked for storage purposes.

An object of the present invention is to overcome the economic disadvantages presented by the aforementioned methods and apparatus and to provide an improved method and improved apparatus for harvesting baled crops that reduces the time, labor and expense of harvesting baled crops without necessitating the relatively large economic investments required by automatic bale wagons.

Another object of the invention is to provide an improved method and improved apparatus for harvesting baled crops which requires a minimum capital investment and which reduces the time and manual labor heretofore required of relatively small farmers to move baled crops from the field to a bale storage area.

Another object of the invention is to provide improved apparatus for harvesting baled crops that is simple in construction, stable, economical to manufacture and assemble, durable, efficient and reliable in operation.

Another object of the invention is to provide improved bale harvesting apparatus which is relatively compact and light in weight, which requires relatively little power or manual labor for operation, and which is readily adaptable to meet the bale harvesting requirements of small farm operations and various types of crops.

Still another object of the invention is to provide improved bale harvesting apparatus which incorporates improved and greatly simplified means for assuring and maintaining bale load stability over rough and varying terrain.

The above as well as other objects and advantages of the present invention will become apparent from the following description, the appended claims and the accompanying drawings.

BRIEF DESCRIPTION OF THE DRAWINGS

FIG. 5 is an enlarged top plan view of the bale harvesting apparatus illustrated in FIg. 1;

FIG. 6 is an enlarged side elevational view of the bale harvesting apparatus illustrated in FIG. 1;

FIG. 7 is a transverse cross-sectional view of the structure illustrated in FIG. 5, taken on the line VII—VII thereof;

FIG. 8 is a transverse cross-sectional view of the structure illustrated in FIG. 5, taken on the VIII—VIII thereof; and FIG. 9 is an enlarged transverse cross-sectional view of the structure illustrated in FIG. 5, taken on the line IX—IX thereof.

DETAILED DESCRIPTION

Figure 1:
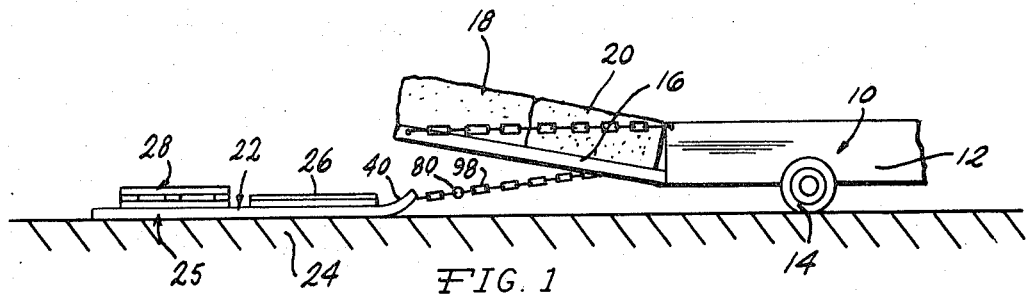
FIG. 1 is a side elevational view of apparatus embodying the present invention, showing the same attached to a partially illustrated, conventional baling machine and prior to the initial step in the improved bale harvesting method.
Figure 2:
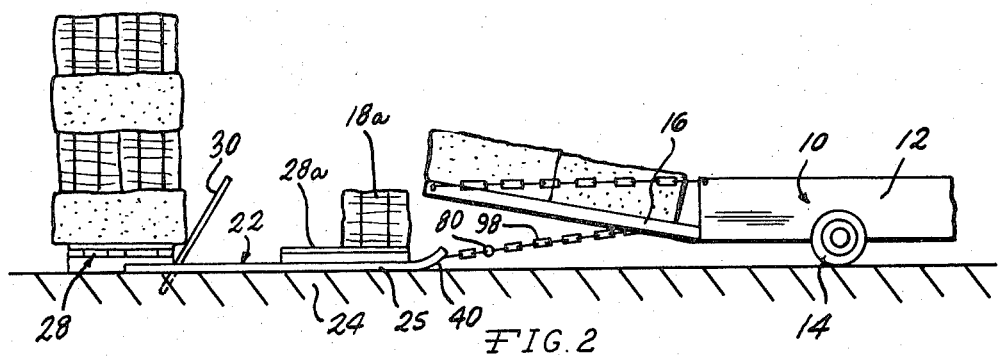
FIG. 2 is a side elevational view of the apparatus illustrated in FIG. 1, showing one of the steps in the improved method of harvesting bale crops.
Figure 3:
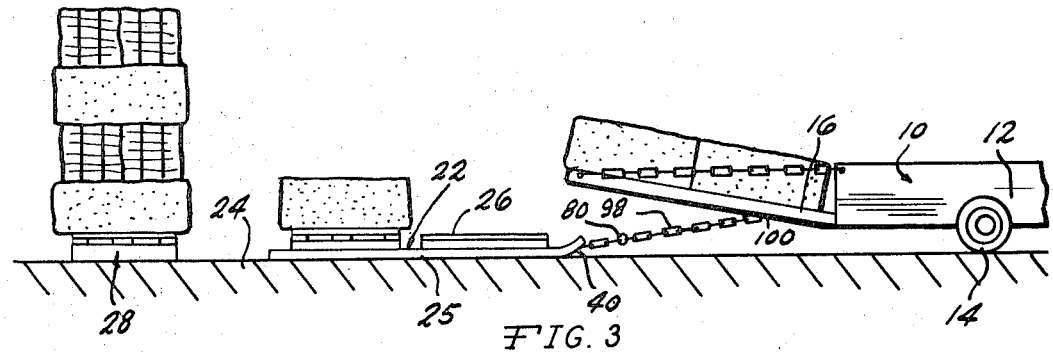
FIG. 3 is a side elevational view similar to FIG. 2, showing another step in the improved method of harvesting bale crops.

Referring to the drawings, and more particularly to FIGS. 1 through 4 thereof, an improved and greatly simplified method and apparatus for harvesting baled crops, such as hay and alfalfa, is illustrated therein. In FIGS. 1, 2 and 3, the rear end portion of a conventional baling machine 10 is illustrated, the baling machine 10 including a chassis 12 mounted on ground engaging wheels 14 and having a conventional discharge chute 16 from which bales, such as 18 and 20, are discharged from the baling machine. In accordance with the present invention, a trailing bale stacker, generally designated 22, is provided which is adapted to be pulled over the ground 24 by the baling machine 10, the trailing bale stacker 22 being described hereinafter in greater detail. In general, the trailing bale stacker 22 includes a plurality of runners, such as 25, and a platform 26 which is fixed to the forward end portions of the runners 25. The rearward end portions of the runners 25 are adapted to support pallets, such as the pallet 28, upon which the bales are manually stacked by an operator riding on the stacker 22. As shown in FIG. 2, after each pallet 28 has been manually loaded with bales by the operator standing on the platform portion 26 of the stacker 22, the operator causes the loaded pallet to be discharged from the stacker 22 onto the ground by manually driving a rod, such as 30, which may be made of steel or other suitable material having sufficient strength to withstand the forces exerted thereon, into the ground 24 between adjacent rails of the stacker 22 so that the loaded pallet is prevented from moving in a forward direction as the stacker rails are pulled out from under the loaded pallet by the baler 10. The loaded pallet is thus deposited onto the surface of the ground as the baler 10 moves the stacker 22 forwardly (to the right as illustrated in FIGS. 1, 2 and 3) while the operator standing on the platform of the stacker 22 manually loads another pallet, such as 28a, which has previously been placed on the stacker 22. As shown in FIG. 2, bales such as 18a may be temporarily stored on the platform 26 while the operator is performing the operations of disengaging a loaded pallet from the stacker 22 through the agency of the rod 30 and replacing the loaded pallet with an empty pallet.

Figure 4:
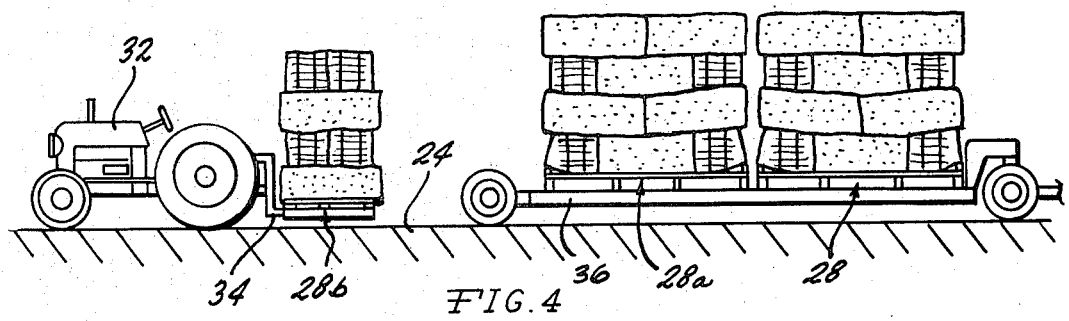
FIG. 4 illustrates the manner in which stacked palletized bales may be loaded onto a low-bed trailer for subsequent hauling to a storage area.

As shown in FIG. 4, after the pallets, such as 28, 28a and 28b, have been loaded and deposited on the ground, a conventional tractor 32 equipped with a conventional fork lift 34 may be utilized to carry the loaded pallets directly to the storage area, or the fork lift equipped tractor may be utilized to load the pallets onto a conventional low-bed trailer 36, the tractor 32 subsequently being utilized to haul the trailer 36 to the storage area and thereafter being utilized to unload the palletized bales from the low bed trailer whereby the baled crop may be stored and/or cured in a palletized condition.

Referring now to FIGS. 5 through 9, the stacker 22 and pallet 28 are illustrated therein in greater detail. As shown in FIGS. 5 through 9, in the preferred embodiment of the invention illustrated, the stacker 22 is comprised of four longitudinally extending, transversely-spaced rails generally designated 25, 25a, 25b and 25c, all of such rails being substantially identical in construction and configuration. As shown in FIGS. 1, 2, 3 and 6, the forward end portions 40 of each of the rails 25, 25a, 25b and 25c curve upwardly in the manner of a conventional sled runner. The lower longitudinal sections of the rails are preferably formed of steel channels having a web portion 42 and a pair of upwardly projecting flange portions 44 and 46, such channel shape lower sections of the rails extending throughout the entire length of each of the rails from the forward end 48 thereof to the rear end 50 thereof. Each of the rails also includes a platform mounting section, generally designated 52, which extends from a position adjacent the point 54 where the upwardly curved forward end portion 46 of each rail begins to curve upwardly, to a position near the longitudinal midpoint 56 of each of the rails. The platform mounting section 52 of each rail is preferably in the form of a box beam in transverse cross-section and is comprised of an inverted, steel-channel section having a web portion 58 extending parallel to the web portion 42, and a pair of spaced flange portions 60 and 62 extending toward and fixed to the flange portions 44 and 46, as by welding the flange portions 60 and 62 to the flange portions 44 and 46, respectively, whereby the web portions 42 and 58 and the flange portions 44, 46, 60 and 62 define a box beam section.

A flexible platform 64 is provided which is preferably made of plywood or other suitable material and which extends over the forward end portions of each of the rails 25, 25a, 25b and 25c, the side edges 66 and 68 of the platform 64 terminating in outwardly spaced relationship with respect to the outer rails 25 and 25c. The flexible platform 64 also preferably extends between the points 54 and 56 on the rails so as to substantially cover the platform mounting portion 52 on each rail. If desired, the forward corners 70 and 72 of the platform 64 may be beveled so as to reduce the tendency of the platform to snag on any loose crops as the stacker 22 moves over the ground. The platform 64 is fixed to the web portion 58 of each of the platform mounting sections 52 provided on each of the rails 25, 25a, 25b and 25c. As shown in FIGS. 5 and 9, the platform 64 is preferably secured to the web portions 58 by a plurality of countersunk headed bolts, such as 74, which project through the platform 64 and web 58 and are retained by conventional nuts 76. With such a construction, the flexible platform 64 permits the rails 25, 25a, 25b and 25c to flex as the stacker 22 moves over varying or rough terrain, and at the same time the rails provide support directly under the pallets, such as 28, thereby eliminating the necessity of providing a framework for the stacker 22. The stacker 22 also includes a draw bar 80 which, if desired, may be tubular in cross-section as illustrated in FIG. 6, the draw bar 80 extending transversely of the stacker 22 at a position near but forwardly spaced from the forward ends 48 of the rails and being secured to each of the rails by U-bolts and link means such as 82, 84 and 86. In the preferred embodiment of the invention illustrated, the U-bolt 82 is secured to the upwardly curved web portion 42 of each of the rails while the U-bolt 86 is secured to the draw bar in spaced relationship and joined to the U-bolt 82 by the link 84, all of the rails being thus connected to the draw bar 80 in a similar manner. Angularly disposed draw chains 88 and 90 are also provided, the rearward end portions of the chains 88 and 90 being connected to U-bolts 92 and 94 fixed to the draw bar 80 while the forward ends of the angularly disposed chains 88 and 90 are connected to a ring 96 to which is attached the rear end of a draw chain 98, the forward end of the chain 98 being connected to the baling machine 10 in any desired or conventional manner, as at 100. Such a construction eliminates side loads on the rails as the stacker 22 is pulled forwardly over the ground by the baler 10.

As previously mentioned, the stacker 22 is adapted to carry pallets, such as 28, while the bales are being unloaded from the chute 16 of the baler 10 by an operator who stands on the platform 64 as the baler 10 pulls the stacker 22 forwardly over the ground. Each of the pallets 28 is preferably made of wood and comprised of a plurality of longitudinally extending, transversely-spaced stringers 102, 104, 106 and 108 adapted to extend into the channels 110 defined by the rear end portions of the rails 25, 25a, 25b and 25c, the vertical dimension of the stringers 102, 104, 106 and 108 being greater than the vertical dimension of the flange portions 44 and 46 of the rails, and the maximum transverse dimensions of the stringers being less than the distance between the flanges 44 and 46 of the rails so that the stringers 102, 104, 106 and 108 fit easily within the confines of the flange portions 44 and 46 of the rails and bear against the upper surfaces of the web portions 42 thereof. The stringers 102, 104, 106 and 108 are connected together by spaced, laterally-extending members 112, 114 and 116 which serve as the support members for the pallets 28 upon which the bales are stacked. In the preferred embodiment of the invention illustrated, side rails 118 and 120 are provided which are fixed to and connect the adjacent end portions of the members 112, 114 and 116 to each other. With such a construction, when the bales are stacked on the pallets, the outer ends of the lower most bales rest on the side rails 118 and 120 while the inner ends of such bales rest on the upper surfaces of the members 112, 114 and 116 whereby the bales tend to tilt slightly inwardly the longitudinal centerline of the pallet thereby incrasing the stability of the stacked bales on each pallet. In addition, the bales are preferably interlocked or interlaced in a conventional manner as they are manually stacked by the operator on each pallet thereby further increasing the stability of the stacked bales on each pallet.

In the bale harvesting operation, the stacker 22 is placed on the ground behind the baler 10 and the chain 98 connected to the baler 10, as at 100, so that the stacker 22 is drawn along behind the baler as the baler passes through the crop. The crop is then cut, raked, windrowed and baled in the conventional manner, the bales being discharged from the discharge chute 16 of the baler 10. As the baler 10 and stacker 22 move forwardly, an operator standing on the platform 64 of the stacker 22 successively manually lifts the bales from the chute 16 and manually stacks the bales on a pallet, such as 28, carried by the rear portions of the rails 25, 25a, 25b and 25c as previously described.

As shown in FIG. 2, when a pallet is fully loaded, the operator manually drives the rod 30 into the ground at a point between the stacker rails and forwardly of the loaded pallet, such as the point X between the rails 25a and 25b. The rod 30 thus prevents the loaded pallet from moving forwardly as the stacker rails are pulled out from under the loaded pallet by the baler 10, and the loaded pallets are thus deposited on the ground for subsequent pick up by the fork lift equipped tractor 32. As previously mentioned, the fork lift 34 may be utilized to lift the loaded pallets onto a low-bed trailer such as the trailer 36 for subsequent haulage to and unloading at the storage area, or the fork lift equipped tractor 32 may be utilized to carry the loaded pallets directly to the storage area. The palletized bales may then be stacked to any convenient height through the agency of the fork lift equipped tractor, and thereafter individual loaded pallets may be withdrawn from the stack as desired.

While a preferred embodiment of the invention has been illustrated and described, it will be understood that various changes and modifications may be made without departing from the spirit of the invention.

What is claimed is:

1. The method of harvesting crops that have initialy been packaged in the form of separate bales which comprises the steps of manually loading and stacking a plurality of said initially separate bales on a pallet on a bale stacking sled while simultaneously moving said sled with both said pallet including the bales stacked thereon and said separate bales in a single direction, stopping the movement of a pallet loaded with bales while continuing the movement of said separate bales so tht said loaded pallet is discharged from said sled onto the ground, transporting a plurality of said previously stopped bale loaded pallets to a storage area, and stacking said bale loaded pallets one upon another.

* * * * *